United States Patent
Fritz et al.

(10) Patent No.: US 6,257,866 B1
(45) Date of Patent: Jul. 10, 2001

(54) APPARATUS FOR ACCURATELY FORMING PLASTIC SHEET

(75) Inventors: Alton L. Fritz, Peoria; Michael L. Fritz; Kenneth A. Fritz, both of Phoenix; Edward J. Gasiorek, Glendale; Wayne L. Case, Peoria, all of AZ (US)

(73) Assignee: Hy-Tech Forming Systems, Inc., Phoenix, AZ (US)

( * ) Notice: Subject to any disclaimer, the term of this patent is extended or adjusted under 35 U.S.C. 154(b) by 0 days.

(21) Appl. No.: 09/286,046

(22) Filed: Apr. 5, 1999

Related U.S. Application Data

(63) Continuation of application No. 08/877,525, filed on Jun. 17, 1997, now abandoned.
(60) Provisional application No. 60/020,226, filed on Jun. 18, 1996.

(51) Int. Cl.[7] .................................................. A01J 21/00
(52) U.S. Cl. ...................................... 425/387.1; 425/388
(58) Field of Search ................................ 425/384, 387.1, 425/388

(56) References Cited

U.S. PATENT DOCUMENTS

| | | | |
|---|---|---|---|
| 3,632,252 | * | 1/1972 | Amberg ................................. 425/388 |
| 3,661,484 | * | 5/1972 | Psota et al. ........................... 425/384 |
| 3,661,486 | * | 5/1972 | MacDonald ........................... 425/388 |
| 4,239,727 | * | 12/1980 | Myers et al. .......................... 425/384 |
| 4,836,762 | * | 6/1989 | Davis, Jr. .............................. 425/388 |
| 5,162,124 | * | 11/1992 | Hausler et al. ....................... 425/384 |
| 5,217,563 | | 6/1993 | Niebling et al. ...................... 156/382 |
| 5,264,172 | | 11/1993 | Rosica et al. ........................ 264/132 |
| 5,283,029 | * | 2/1994 | Ellemor ................................ 425/384 |
| 5,529,479 | * | 6/1996 | Souders ................................ 425/384 |
| 5,641,524 | * | 6/1997 | Rush et al. .......................... 425/387.1 |

OTHER PUBLICATIONS

Article entitled "In Mold Decorating Technical Guide", General Electric Company, 12/95, pp. 2–16 and title page.
Article entitled "Injection Moulded Parts with a Decorative Surface—A Comparison of the Different Processes", based on the paper first publ. in Plastverarbeiter 44 (1993) submitted by Mr. D.L. Joachim Wank, (6 pages).

* cited by examiner

Primary Examiner—James P. Mackey
(74) Attorney, Agent, or Firm—Cahill, Sutton & Thomas P.L.C.

(57) ABSTRACT

A sheet of thermoformable plastic material is positioned by air pressure adjacent a planar surface of a heating plate to heat and at least soften the sheet. The softened sheet is draped over a mold by the force of air pressure to form a molded part upon cooling. Registration pins engaging the sheet maintain the sheet in registration with the mold to insure correct positioning of any indicia on the sheet with corresponding elements of the mold. A plurality of sheets may be fused to one another during heating of the sheets.

21 Claims, 4 Drawing Sheets

APPARATUS FOR ACCURATELY FORMING PLASTIC SHEET

CROSS-REFERENCE TO RELATED APPLICATIONS

This is a continuation of application Ser. No. 08/877,525, filed Jun. 17, 1997, now abandoned, entitled "APPARATUS FOR ACCURATELY FORMING PLASTIC SHEET", which application claims priority with respect to common subject matter to provisional application Ser. No. 60/020, 226 filed Jun. 18, 1996, entitled "APPARATUS FOR FORMING PLASTIC SHEET", both of which applications describe inventions by the present inventors.

BACKGROUND OF THE INVENTION

1. Field of the Invention

The present invention relates to apparatus for forming plastic sheet and, more particularly, to accurately thermoforming plastic sheet in registration with a mold.

2. Description of Related Art

Cold forming of plastic sheet material in conformance with a mold has the benefit of not requiring delays for cooling purposes associated with thermoforming sheet material at a temperature in excess of the transition ($T_g$) temperature. However, cold forming requires significant pressures in the range of 50–300 bars depending upon the characteristics of the sheet material and the nature of the mold. Moreover, the resulting stretching of material, particularly for deep drawn plastic pieces, usually results in distortion of any indicia disposed upon the sheet material. Accordingly, the indicia must be applied subsequent to the cold forming process or through use of an added sheet material containing the indicia.

Thermoforming sheet material by conventional heating of the sheet to at least the softening temperature produces sag of the material prior to contact with a mold. Such sag may distort any indicia disposed upon the sheet. Moreover, the heating is usually not uniform across the sheet and will produce cold spots and hot spots. The uneven heating will result in uneven stretching of the material over a mold.

SUMMARY OF THE INVENTION

Thermoforming plastic sheet material in conformance with a mold is initiated by locating the sheet material against a heated planar plate. Above ambient or below ambient air pressure or a combination thereof may be used to position the sheet material adjacent the surface. Heat from the plate is uniformly transferred by conduction to the sheet material. By a rapid reversal of the air pressure applied to opposed sides of the heated sheet material, it is placed adjacent and deep drawn about a mold. Usually, indicia on the sheet material corresponds with the high surfaces of the article to be molded and the initial contact of the sheet material with such elements of the mold brings about immediate and rapid cooling to prevent deformation of the indicia during the subsequent near instantaneous deep drawing of the sheet in response to the pressures imposed. Registration pins or the like fixedly position the sheet material with respect to the mold to ensure registration of the indicia with the corresponding surfaces of the mold. The use of temperature sensors sensing heat radiating from the sheet material during the heating step permits controlled heating without impinging upon or otherwise affecting the sheet material during either heating, forming, or cooling of the sheet material. If two or more sheets are adjacent one another, they can be fused or bonded to one another during the heating step.

It is therefore a primary object of the present invention to provide apparatus for accurately forming plastic sheet material in conformance with a mold.

Another object of the present invention is to provide apparatus for heating sheet material during a thermoforming process without permitting the sheet material to sag during the heating process.

Still another object of the present invention is to provide a pressure environment to maintain plastic sheet material adjacent a heating surface and to rapidly deep draw the sheet material about a mold after heating.

A further object of the present invention is to provide a sealed pressure environment using a combination of above and below ambient gas pressures to position sheet material during the heating step and the molding step of a thermoforming process.

A still further object of the present invention is to provide registration pins for positioning sheet material with respect to a mold during the heating and the deep drawing of the sheet material about the mold.

A yet further object of the present invention is to fuse a plurality of sheets and form the fused sheets about a mold.

A yet further object of the present invention is to provide a method for thermoforming plastic sheet material.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which.

DETAILED DESCRIPTION OF THE PREFERRED EMBODIMENT

Figure 1:
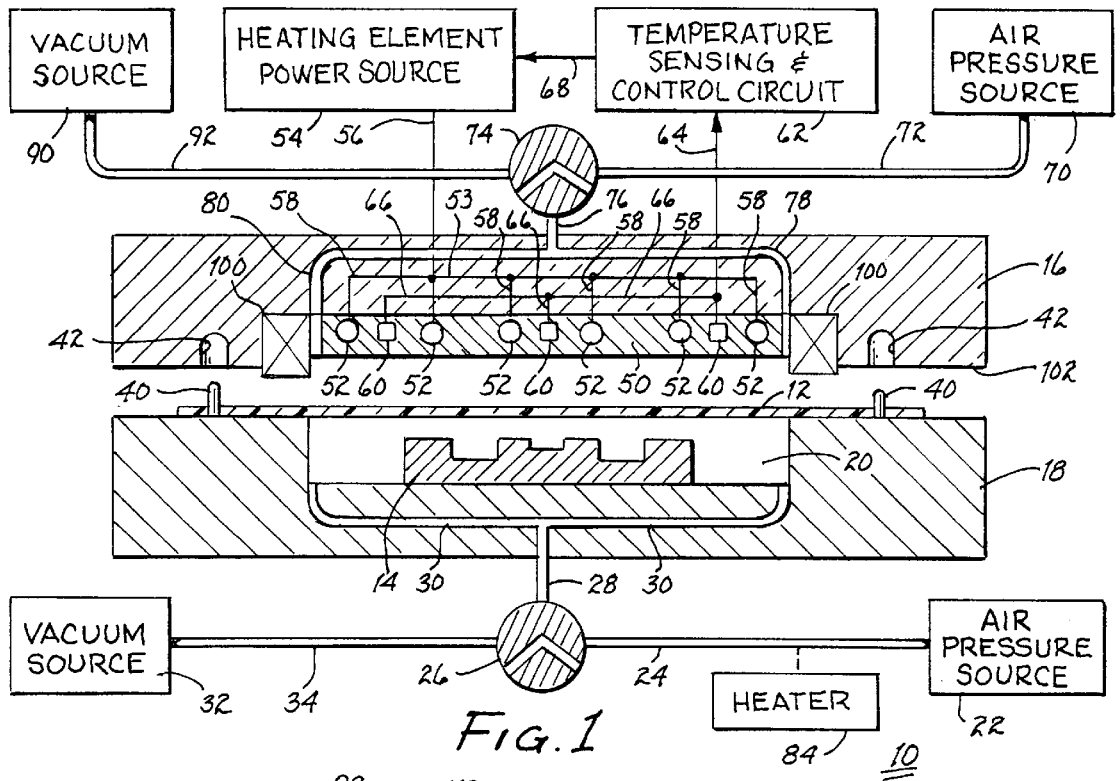
FIG. 1 illustrates a cross-sectional view of the major components of the apparatus for performing a thermoforming process on a sheet of plastic material.

Referring to FIG. 1, there is illustrated apparatus 10 for thermoforming a sheet 12 of plastic material in conformance with a tool or mold 14. The apparatus includes an upper platen 16 and a table or lower platen 18. It is to be understood in the following discussion that these platens may be reversed in position and function or at an orientation other than horizontal as indicated. Lower platen 18 includes a recess or cavity 20 wherein a mold 14 is lodged. This mold defines the article to be formed from sheet 12. A pressure source 22 of air or gas under pressure (0–2000 psi) is in fluid communication with cavity 20 through conduit 24, valve 26 and conduit 28. One or more conduit arms 30 extend from conduit 28 into fluid communication with cavity 20. A vacuum source 32 (0–29 inches Hg) or other source of low pressure is selectively in fluid communication with cavity 20 through conduit 34, valve 26, conduit 28, and conduit arms 30. A plurality of pins 40 extend from lower platen 18 for penetrable engagement with sheet 12 to establish registration of the sheet with mold 14 and to hold the sheet in place. This is particularly important when the sheet includes indicia that is to be accurately located with respect to the mold during the deep draw molding process to be performed.

Upper platen 16 includes recesses or cavities 42 for receiving registration pins 40 when the upper platen is lowered upon the lower platen. A heating plate 50 is located within the upper platen for heating the area of sheet 12 of interest. Typically, the heating plate is of a length and width commensurate with the dimensions of cavity 20. The heating plate may include a plurality of heating elements 52 disposed throughout the heating plate to maintain the heating plate at a relatively constant temperature throughout. A power source 54 provides electrical power to each of heating elements 52, assuming that they are electrically actuated heating elements. It is to be understood that the heating plate may be heated by hot gases, flames, chemicals, or other heating means. Assuming that the power source is a source of electrical power, conductor 56 and branch conductors 58 interconnect each of the heating elements with the power source. To maintain the heating plate at a uniform temperature throughout, a plurality of temperature sensors 60 may be disposed at discrete locations within the heating plate. Each of these temperature sensors may be collectively or individually electrically connected to a temperature sensing and control circuit 62 via conductors 64 and branch conductors 66. The operation of power source 54 is regulated by the temperature sensing and control circuit via signals transmitted therebetween through conductor 68. Thereby, the heating plate is uniformly at a desired temperature. A typical temperature for forming the sheet material is in the range of about 100° F. to about 400° F.

A source of gas under pressure, such as air pressure source 70, provides a high pressure environment (0–2000 psi) attendant the lower surface of heating plate 50 via conduit 72, valve 74, conduit 76, and two or more branch conduits 78,80. It is to be understood that additional branch conduits may interconnect with conduit 76 to provide a plurality of air pressure outlets about the perimeter of the heating plate. A gas under lower pressure, such as vacuum source 90 (0–29 inches Hg), is in fluid communication with the bottom surface of heating plate 50 through a conduit 92, valve 74, conduit 76, and two or more branch conduits 78,80.

During heating and thermoforming of sheet 12, the upper and lower platens are brought together. A continuous seal 100 is disposed in upper platen 16 (or may be in lower platen 18) and extends about heating plate 50. As shown, this seal extends below bottom surface 102 of the upper platen to ensure compression of the seal prior to contact between the upper and lower platens. As shown, registration pins 40 are located laterally of seal 100 and support sheet 12 therebetween. Upon closure of the upper and lower platens, seal 100 will come in contact with sheet 12 and exert a downward force thereon. The downward force, in combination with the resulting compression of seal 100, serves two functions. First, it stabilizes sheet 12 to preclude any movement of the sheet not inhibited by registration pins 40 and locks the sheet in place. Second, it seals cavity 20 to permit a change in pressure within cavity 20 resulting from operation of either air pressure source 22 or vacuum source 32 and to permit a change in pressure between sheet 12 and heating plate 50 as a result of operation of air pressure source 70 or vacuum source 90. It may be noted that sheet 12 serves in the manner of a diaphragm to segregate the pressure environments above and below the sheet. Also, as a diaphragm, the sheet is responsive by movement to any existing pressure differential above and below the sheet.

Figure 2:
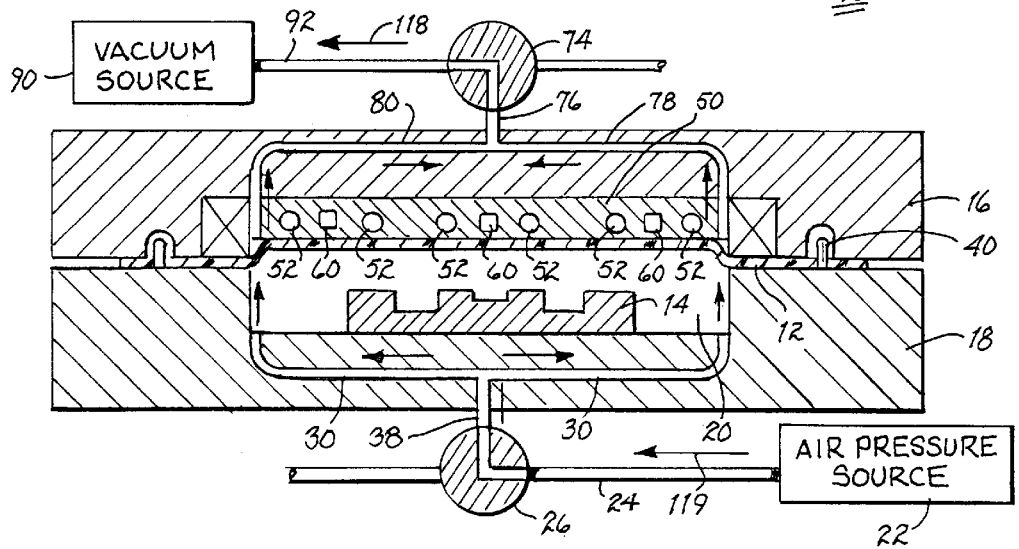
FIG. 2 illustrates the apparatus during heating of the plastic sheet material.

To thermoform a molded part from plastic sheet material 12, a mold 14 is placed in a predetermined position in cavity 20, as illustrated in FIG. 1. The sheet of material to be thermoformed, is mounted upon registration pins 40 to ensure correct positioning of any indicia appearing on the sheet with respect to the corresponding parts of the mold. Upper platen 16 is lowered upon lower platen 18 and engagement of seal 100 with sheet 12 resting upon the lower platen will create a sealed compartment between the sheet and heating plate 50 and cavity 20 beneath the sheet will be sealed. Heating elements 52 are energized by heating element power source 54 to heat the heating plate to a preset temperature determined by temperature sensing control circuit 62 and sensed by sensors 60; preferably, the heating plate is heated to the operating temperature prior to mounting of the sheet upon the registration pins. The uniform temperature of the heating plate will impart heat uniformly to the sheet. To prevent sag of sheet 12 as a result of heating of the sheet above its softening temperature, vacuum source 90 is energized to reduce the pressure in the compartment formed between heating plate 50 and sheet 12, as depicted by arrow 118. The resulting reduced pressure will draw sheet 12 against the heating plate and the sheet will be heated as a result of heat conduction therebetween. Movement of sheet 12 toward the heating plate, as illustrated in FIG. 2, may be enhanced by energizing air pressure source 22 to pressurize cavity 20, as depicted by arrow 119, and thereby urge sheet 12 against heating plate 20. Alternatively, energization of air pressure source 22 may be sufficient without the added benefit of energizing vacuum source 90 to locate sheet 12 adjacent the heating plate. When indicia/graphics appear on the upper surface, it may be beneficial to heat the air/gas flowing into cavity 20 and heat the lower surface of the sheet, as represented by heater 84.

Figure 3:
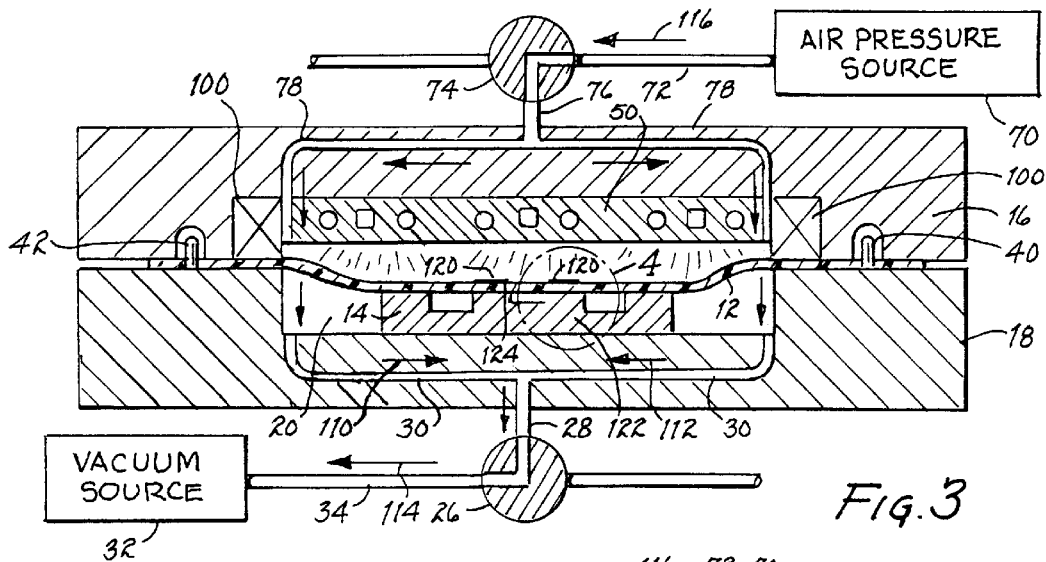
FIG. 3 illustrates the initial contact of the plastic sheet material with a mold.
Figures 4, 6:
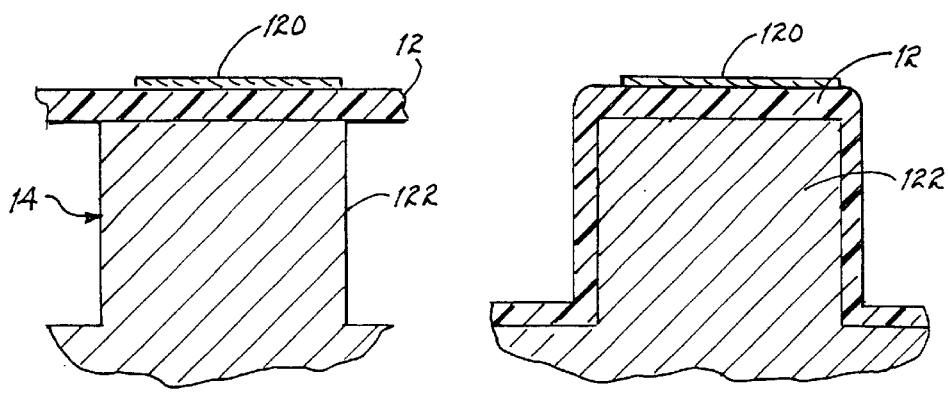
FIG. 4 is a detail view taken within the circle designated 4 in FIG. 3.
FIG. 6 is a detail view taken with the circle designated 6 in FIG. 5.

After the temperature of sheet 12 has arisen to a sufficient predetermined temperature, the vacuum source is disconnected by operation of valve 74 to interconnect air pressure source 70 through conduits 72,76 and branch conduits 78 with the compartment between sheet 12 and heating plate 50, as shown in FIG. 3. The resulting air flow depicted by arrow 116 will cause a pressure rise acting upon sheet 12 to force it downwardly. Simultaneously, or alternatively, air pressure source may be disconnected through operation of valve 26 and vacuum source 32 may be placed in fluid communication with cavity 20 via conduits 34, 28, and conduit arms 30. The resulting air or gas flow out of cavity 20 is depicted by arrows 110, 112 and 114. Thus, sheet 12 is subjected to high air pressure on its upper side and low air pressure on its bottom side to urge it onto and be deep drawn over mold 14. The sheet may include indicia 120 corresponding in location to ridges 122,124 of the mold. Upon initial contact of sheet 14 with ridge 122, as depicted in FIG. 4, an immediate cooling of the contact area of the sheet will occur. Such contact area corresponds with indicia 120. The immediate cooling will be more resistive to stretching than the adjacent non-cooled heated sheet. Thus, distortion of indicia 120 will not occur during deep drawing of the sheet.

Figure 5:
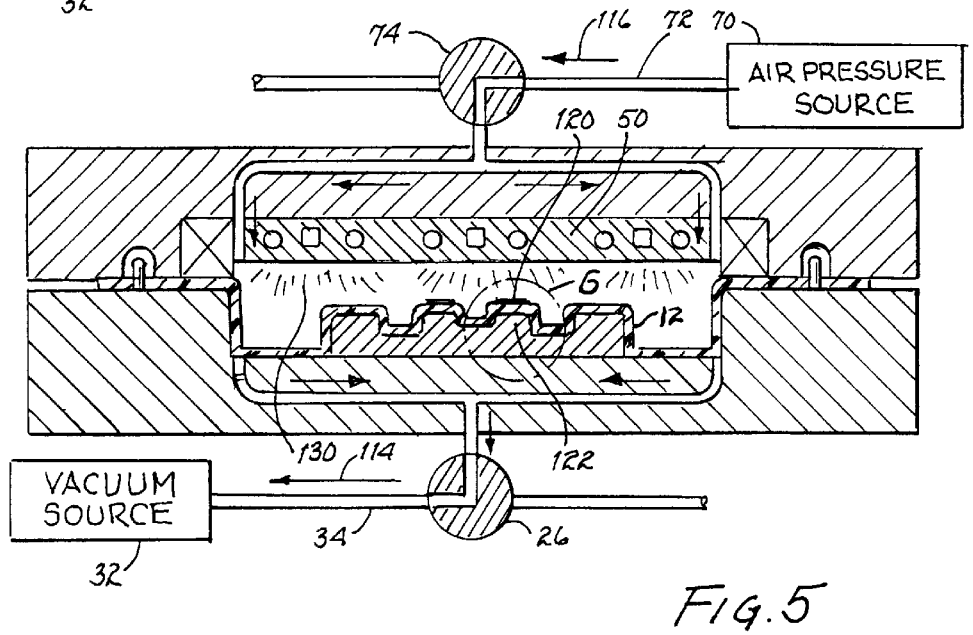
FIG. 5 illustrates the plastic sheet material deep drawn about the mold.

As a result of heating of sheet 12 to a temperature above its softening temperature, and for some materials to a temperature past its glass transition temperature ($T_g$), alone or in combination with the higher pressure above the sheet and the lower pressure beneath the sheet, the sheet will be drawn about the mold, as depicted in FIG. 5. Use of temperatures at or above $T_g$ permits mobility of the plastic at the molecular level to reposition itself in conformance with the mold contours without creating massive internal stresses and strains. The values of the positive and negative pressures applied to the sheet are a function of the material of the sheet and the configuration of the mold. That is, a mold having significant vertical dimensions will require stretching of the sheet to a greater extent than a mold having less vertical excursions; to effect such stretching, additional pressure differential may be required. To enhance conformance of the sheet material with the mold, the mold may be porous and in fluid communication with vacuum source 32. Depending on the type and nature of sheet material used, a diaphragm or sheet of silicone rubber or urethane can be placed adjacent the upper surface of sheet 12, to respond to the pressures imposed and help sheet 12 conform with the mold.

As depicted in FIG. 5 by rays 130, heating element 50 may continue to be heated and thereby continue to radiate heat to maintain the temperature of sheet 12 sufficiently high until completion of the molding process. As particularly shown in FIG. 6, the portion of sheet 12 positioned adjacent the top surface of ridge 122 is of essentially the same thickness as the sheet was prior to heating. This results from the lack of sag of the sheet during the heating process and the initial rapid cooling of the sheet upon contact with the top surface of the ridge. The remaining part of the sheet will be stretched as a result of the positive and negative air pressures applied and the sections of the sheet extending along vertical or non-horizontal portions of mold 14 will be thinned.

Figure 7:
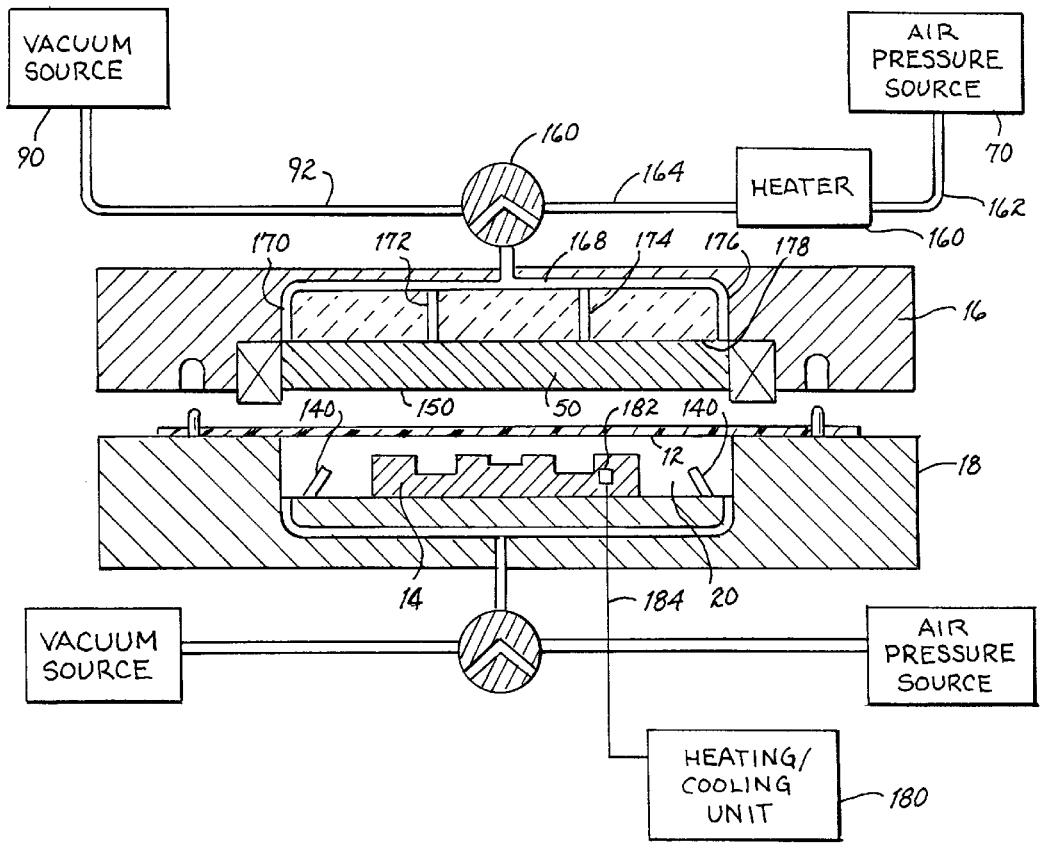
FIG. 7 illustrates a variant of the heating plate shown in FIG. 1.

Referring to FIG. 7, variant structures of apparatus 10 will be described. Temperature sensors 60 provide an accurate temperature of heating plate 50. However, such temperature will inherently be somewhat different than the actual temperature of sheet 12. To obtain and use for control purposes an accurate temperature of sheet 12, one or more temperature sensors 140 may be employed. These temperature sensors sense heat radiation from sheet 12 and translate such radiation into a determination of the temperature of the sheet. A typical sensor for this purpose is sold under the trademark THERMALERT MI by Raytek of Santa Cruz, Calif. Because the sensors are not in contact with the sheet, they have no cooling effect upon any part of the sheet. The number and location of the sensors may be varied depending upon a plurality of factors such as the degree of control required, the criticality of accurate temperature sensing, etc. As illustrated, the sensors may be disposed within cavity 20 separated from mold 14 so as not to interfere with the molding of sheet 12.

Heating plate 50 is illustrated in FIG. 1 as having a lower surface somewhat raised above the bottom surface of upper platen 16. This will result in a drawing of sheet 12 adjacent the heating plate, during heating of the sheet, as depicted in FIG. 2. Under certain circumstances, such repositioning of sheet 12 may not be desired. Accordingly, FIG. 7 depicts the lower surface of heating element 15 being essentially planar with the lower surface of upper platen 16. Thus, upon lowering the upper platen upon lower platen 18, the sheet will be adjacent and in contact with lower surface 150 of the heating element.

To reduce the likelihood of surface deformation or marking of the sheet, a layer of rubber or elastomer type material may be added to lower surface 150 of heating plate 50. Necessarily, such layer must be heat conductive to transfer heat from the heating plate to the sheet.

To enhance drawing sheet 12 adjacent the lower surface of heating element 50 and to more uniformly distribute air pressure above sheet 12, the heating element may be formed of sintered or porous material. A typical material for this purpose is sold under the trademark METAPOR F100 AL by Portec-North America, a division of Nest Technologies of Studio City, Calif. As shown in FIG. 7, air is drawn from porous heating plate 50 through a plurality of conduits 170, 172, 174, 176 and valve 166 of a plenum chamber 168 into conduit 92 to vacuum source 90. The resulting uniform low pressure environment attendant lower surface 150 of the heating plate will act uniformly on sheet 12 to retain the sheet against lower surface 150. To force the sheet downwardly toward the mold, the air from air pressure source 70 is conveyed through conduit 162, conduit 164 and valve 166 into a plenum chamber 168. This plenum chamber includes a plurality of conduits for channeling the received air under pressure to heating plate 50. By ensuring that cavity 178 within which the heating plate is housed, has no air leaks, all of the air channeled to the heating plate will migrate through the heating plate and create a high pressure environment adjacent the upper surface of sheet 12 and force it toward mold 14. The air flow into the heating plate may be heated by heater 160. The heat of the heated air, in combination with the air pressure exerted by the heated air flowing through the sintered heating plate, will urge the sheet downwardly while continuing to maintain it hot. Simultaneously, a low pressure environment within cavity 20 beneath sheet 12 will draw the sheet downwardly and about mold 14.

Depending upon numerous variables attendant the composition and characteristics of sheet 12 (whether single or multiple fused or bonded sheets) and the configuration of mold 14, the mold may be heated and/or cooled. Such heating/cooling may be uniformly distributed throughout the mold or may be limited to selected parts of the mold. As depicted in FIG. 7, a heating/cooling unit 180 is in communication with receiver 182 in mold 14 through an interconnection 184 to set the temperature of the mold or parts thereof. It is to be understood that the heating/cooling unit may provide a liquid, such as water, at an elevated or reduced temperature to heat or chill the mold, or parts of it; in such case, receiver 182 would be one or more passageways disposed within the mold to distribute the heated/cooled fluid through selected parts of the mold. The return line for the fluid may be part of the conduit forming interconnection 184 or it may be otherwise discharged. Alternatively, the heating/cooling unit may be a source of electrical power to energize heating coils represented by receiver 182. Cooling through use of electricity is also contemplated.

Figure 8A:
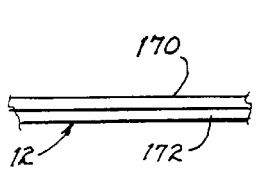
FIGS. 8A and 8B illustrate use of a plurality of sheets of plastic to be fused and/or formed.

Referring to FIG. 8A, sheet 12 is depicted as multiple sheets of plastic material 170,172. Although only two sheets are illustrated, it is to be understood that one or more further sheets may be added. These sheets can be formed into shapes simultaneously by the apparatus and procedures described above. Furthermore, the sheets can be fused to one another as a result of the heat emanating from heating plate 50 when sheets 170,172 are placed thereagainst. If the plurality of sheets are heated to a temperature sufficient to be at or above the transition zone ($T_g$) of all sheets, there occurs a transition at the molecular level between the sheets and the subsequent contact pressure between the sheets results in thermofusing or a bonding adhesion between the sheets. Plastic materials, such as polymers sold under the trademarks LEXAN, VALOX, XENOY, CYCOLAC and CYCOLOY, have a high capability for thermal adhesion and tests indicate that bonding is repeatable.

Figure 8B:
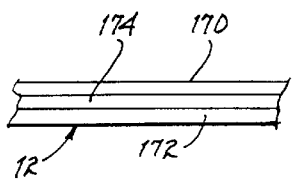

The plurality of sheets of plastic material 170,172 may be adhered to one another through use of an adhesive layer 174, as shown in FIG. 8B. Such adhesive layer 174 may be of the type that is heat activated to bring about adhesion between sheets 170 and 172 during contact of the plurality of sheets with heating plate 50. It is to be noted that an adhesive layer is not mandatory to achieve bonding between the sheets of plastic material.

The sheets of plastic material may be fused on one side or both sides with either similar or dissimilar sheets of plastic material in a variety of combinations to achieve a variety of effects. For instance, a specific chemical or solvent resistant plastic material may be fused adjacent a sheet of plastic material which has a specialized mechanical feature(s) to add to a finished plastic product. For example, UV resistant sheet material may be fused over a sheet having printed graphics thereon to protect such graphics against deterioration by UV radiation. For inmold decoration (IMD), a sheet to become an IMD insert can have the printed or other graphics placed thereon protected by fusing or bonding a sheet of plastic material thereover. Thereafter, the IMD insert can be used in the conventional injection molding process without fear of distortion or damage to the printing or the graphics on the IMD insert.

By experience, it has been learned that fusing or bonding of a plurality of sheet materials will occur at a temperature in the range of about 100° F. to about 600° F. The precise range or temperature is dependent upon the glass transition temperature ($T_g$) and other temperature characteristics of the material being processed. A typical temperature for processing thermoplastics, such as polycarbonates, will be between the softening temperature and the melting temperature; the glass transition temperature ($T_g$) is probably the critical minimum temperature threshold for proper adhesion and bonding.

Figure 9:
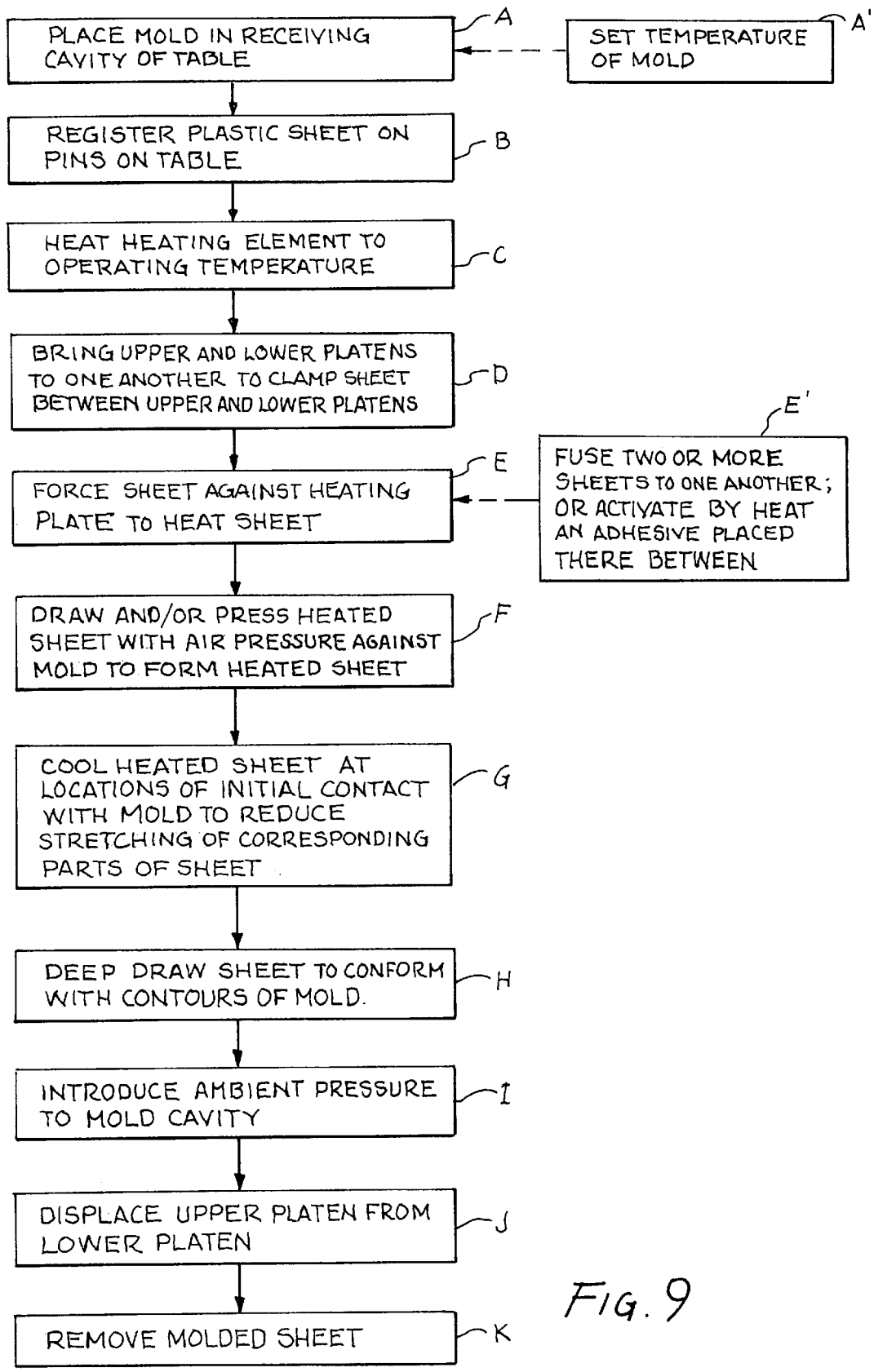
FIG. 9 is a flowchart of the process performed by the apparatus illustrated in FIGS. 1–7.

Referring to FIG. 9, there is illustrated a flowchart for the process performed by above-described apparatus 10. Step A recites the placing of mold 14 within cavity 20 of the table or lower platen 18. An additional step A' may be undertaken to set the temperature of the mold if it is to be other than at an ambient temperature. Step B contemplates placing of the sheet of plastic material upon the registration pins to obtain registration of the sheet with the underlying mold. Step C requires the heating of the heating element to its operating temperature, which temperature is a function of the composition of the sheet material and the characteristics of the mold. However, steps B and C may be reversed. In step D, the upper and lower platens are brought together to clamp the sheet material therebetween. By placing the sheet material adjacent the bottom surface of the heating plate as a result of vacuum, air pressure, and/or position of the lower surface of the heating plate, the sheet material will become heated in step E. If a plurality of sheets are placed adjacent one another, they can be fused or bonded to one another by the heat applied, as depicted in step E. Alternatively, a heat activated adhesive placed between the sheets can be used to adhere the sheets to one another. After the temperature of the sheet material has arisen to a temperature above the softening temperature, the sheet is forced against the mold by applying air pressure and/or vacuum in step F. Step G contemplates the initial rapid cooling of the sheet at locations of the sheet initially contacted by the mold to reduce stretching of the respective parts of the contacted sheet and preserve the integrity of any indicia associated therewith in step G. Step H is a continuation of step G and includes deep drawing of the sheet about the mold as a result of the air pressure and/or vacuum applied to conform the sheet with the contours of the mold. On completion of the deep drawing step H, ambient pressure may be introduced to the mold cavity in step I to eliminate pressure forces acting upon the sheet and to assist in cooling of the sheet. In step J, the upper platen is displaced from the lower platen to expose the molded sheet. Thereafter, the molded sheet may be removed as step K.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

What is claimed is:

1. Apparatus for thermoforming a sheet of plastic material having indicia disposed thereon into a molded part with minimum distortion of the indicia on a mold having raised ridges corresponding with the indicia disposed on the sheet, the ridges being adapted to make the initial contact with the sheet to effect initial cooling of the sheet at locations corresponding with the indicia to minimize distortion of the indicia during subsequent, stretching of the sheet about the mold, said apparatus comprising in combination:

(a) a first platen for heating the sheet, said first platen including a heating plate having a planar surface against which the sheet is located to impart heat to the sheet;

(b) first pressure means for urging the sheet against said planar surface of said heating plate;

(c) a second platen for supporting the mold;

(d) registration means for registering the sheet relative to the mold;

(e) said first platen including a planar bottom surface extending laterally circumferentially about said heating plate and a continuous compressible seal disposed in said first platen and protruding past said planar bottom surface in its uncompressed state, said continuous seal being adapted to bear against the sheet and effect a seal between said first and second platens upon compression of said continuous seal; and (f) second pressure means for urging the heated sheet to drape over the mold to form the molded part.

2. The apparatus as set forth in claim 1 wherein said second-pressure means comprises a source of gas at a pressure above ambient pressure.

3. The apparatus as set forth in claim 1 wherein said second-pressure means comprises a source of gas at a pressure below ambient pressure.

4. The apparatus as set forth in claim 1 wherein said first pressure means comprises a source of gas at a pressure above ambient pressure to force the sheet against the mold and said second pressure means comprises a source of gas at a pressure below ambient pressure to draw the sheet against the mold.

5. The apparatus as set forth in claim 1 wherein said heating plate is heated by heating elements.

6. The apparatus as set forth in claim 5 including means for locating the sheet adjacent said heating plate.

7. The apparatus as set forth in claim 1 wherein said first pressure means comprises a source of vacuum for drawing the sheet against said heating plate.

8. The apparatus as set forth in claim 1 wherein said second pressure means comprises a source of gas under pressure for urging the sheet against said heating plate.

9. The apparatus as set forth in claim 7 wherein said first pressure means comprises a source of gas under a pressure below ambient pressure for urging the sheet against said heating plate.

10. The apparatus as set forth in claim 9 wherein said second pressure means includes a source of vacuum for drawing the sheet onto the mold and said first pressure means comprises a source of gas under pressure for draping the sheet onto the mold.

11. The apparatus as set forth in claim 1 wherein at least one part of the sheet bears indicia and wherein the mold includes means for maintaining the mold at a temperature below the softening temperature of the sheet to cool the sheet upon contact with the mold proximate the indicia and to prevent deformation of the parts of the sheet bearing the indicia.

12. The apparatus as set forth in claim 1 wherein said registration means comprises registration pins extending from the mold through commensurate apertures in the sheet.

13. The apparatus as set forth in claim 1 wherein said heating plate is porous to accommodate air flow therethrough.

14. The apparatus as set forth in claim 13 wherein said porous heating plate is in fluid communication with said first pressure means.

15. The apparatus as set forth in claim 1 wherein the mold is porous.

16. The apparatus as set forth in claim 15 wherein the porous mold is in fluid communication with said second pressure means.

17. The apparatus as set forth in claim 1 wherein the sheet forms a diaphragm to establish two separate pressure chambers within said apparatus, one of said pressure chambers including said heating plate and the other of said pressure chambers including the mold.

18. The apparatus as set forth in claim 1 including a unit for setting the temperature of the mold.

19. The apparatus as set forth in claim 1 wherein said first and second pressure means are in fluid communication with a common side of the sheet.

20. The apparatus as set forth in claim 1 wherein said first and second pressure means are in communication with opposed sides, respectively, of the sheet.

21. Apparatus for molding an article from plastic sheet material with minimum distortion of indicia disposed on the plastic sheet material, said apparatus comprising in combination:

(a) first and second cavities disposed in first and second platens, respectively, separated from one another by the plastic sheet material;

(b) a heating plate for heating the plastic sheet material, said heating plate being located in one of said first and second cavities;

(c) a mold defining the article to be molded, said mold being located in the other of said first and second cavities, said mold having raised ridges corresponding with the indicia disposed on the plastic sheet material, said ridges being adapted to make the initial contact of the plastic sheet material with said mold to effect initial cooling of the plastic sheet material at locations corresponding with the indicia to minimize distortion of the indicia during subsequent stretching of the plastic sheet material about said mold;

(d) a source for sequentially creating a pressure environment in at least one of said first and second cavities to urge the plastic sheet material against said heating plate to heat the plastic sheet material and thereafter to urge the heated plastic material about the mold to form the article; and (e) said first platen including a planar bottom surface extending laterally circumferentially about said first cavity and a continuous compressible seal disposed in said first platen and protruding past said planar bottom surface in its uncompressed state, said continuous seal being adapted to bear against the plastic sheet material and effect a seal between said first and second platens upon compression of said continuous seal.

* * * * *